US010275445B2

(12) United States Patent
Hayase (10) Patent No.: US 10,275,445 B2
(45) Date of Patent: Apr. 30, 2019

(54) DOCUMENT PROCESSING DEVICE, DOCUMENT PROCESSING METHOD, PROGRAM, AND INFORMATION STORAGE MEDIUM (71) Applicant: Rakuten, Inc., Tokyo (JP)

(72) Inventor: Kazuyoshi Hayase, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 14/778,081

(22) PCT Filed: Mar. 19, 2013

(86) PCT No.: PCT/JP2013/057908
§ 371 (c)(1),
(2) Date: Sep. 18, 2015

(87) PCT Pub. No.: WO2014/147767
PCT Pub. Date: Sep. 25, 2014

(65) Prior Publication Data
US 2016/0055146 A1 Feb. 25, 2016

(51) Int. Cl.
G06F 17/20 (2006.01)
G06F 17/24 (2006.01)
G06F 17/27 (2006.01)

(52) U.S. Cl.
CPC .......... G06F 17/2735 (2013.01); G06F 17/20 (2013.01); G06F 17/241 (2013.01)

(58) Field of Classification Search
None
See application file for complete search history.

(56) References Cited

U.S. PATENT DOCUMENTS 5,506,370 A * 4/1996 Nakai ................ G09B 15/04
348/484
6,128,632 A * 10/2000 McCully ............ G06F 17/241
715/210

(Continued)

FOREIGN PATENT DOCUMENTS

JP H11-39298 A 2/1999
JP 2001-125892 A 5/2001

(Continued)

OTHER PUBLICATIONS

Machine Translation of JP2001125892.*
English Translation of International Search Report for PCT/JP2013/057908 dated May 28, 2013.

Primary Examiner — Thuykhanh Le
(74) Attorney, Agent, or Firm — Hea Law PLLC (57) ABSTRACT Displaying supplemental information for an element in a document based on changes in a user's ability to read the document. A document processing device configured to: acquire information on a document including a plurality of words; acquire pieces of supplemental information being linked with the plurality of words; decide whether or not a piece of supplemental information linked with corresponding one of the plurality of words is to be displayed based on a frequency with which each of the plurality of words has appeared; and control displaying the plurality of words and the pieces of supplemental information. In the deciding, it is decided whether or not the corresponding one of the piece of supplemental information is to be displayed based on a frequency with which each of the plurality of words has been displayed along with the piece of supplemental information.

10 Claims, 6 Drawing Sheets (56) References Cited

U.S. PATENT DOCUMENTS

| | | | |
|---|---|---|---|
| 8,943,404 B1* | 1/2015 | Mager | G06F 15/00 |
| | | | 715/256 |
| 9,460,089 B1* | 10/2016 | Rathod | G06F 17/289 |
| 2006/0010378 A1* | 1/2006 | Mori | G09B 7/02 |
| | | | 715/234 |
| 2007/0273558 A1* | 11/2007 | Smith | G08G 1/0962 |
| | | | 340/995.1 |
| 2009/0164455 A1* | 6/2009 | Weinberg | G06F 17/2211 |
| 2009/0288005 A1* | 11/2009 | Stapleton | G06F 17/30017 |
| | | | 715/711 |
| 2010/0057434 A1* | 3/2010 | Konno | G06F 17/289 |
| | | | 704/3 |
| 2011/0164291 A1* | 7/2011 | Kutsumi | G06F 17/214 |
| | | | 358/464 |
| 2012/0102393 A1* | 4/2012 | Kutsumi | G06F 17/214 |
| | | | 715/243 |
| 2012/0117461 A1* | 5/2012 | Sata | G06F 17/211 |
| | | | 715/243 |
| 2012/0299835 A1* | 11/2012 | Yoshida | G06F 3/018 |
| | | | 345/171 |
| 2013/0158984 A1* | 6/2013 | Myslinski | G06F 17/28 |
| | | | 704/9 |

FOREIGN PATENT DOCUMENTS

| | | | | |
|---|---|---|---|---|
| JP | 2001125892 | * | 5/2001 | G06F 17/21 |
| JP | 2002-108853 A | | 4/2002 | |

* cited by examiner

| ID | ELEMENT | SUPPLEMENTAL INFORMATION | LEVEL | GENRE |
|---|---|---|---|---|
| wa10 | 家 | いえ | 2 | GENERAL |
| wa31 | 同じ | おな | 2 | GENERAL |
| wk09 | お金 | かね | 1 | GENERAL |
| wb50 | 貧乏 | びんぼう | 5 | GENERAL |
| wb90 | 僕 | ぼく | 7 | GENERAL |

FIG.6

| ID | LEARNING SCORE | COUNT | LEARNING COMPLETED FLAG |
|---|---|---|---|
| wa10 | 20 | 13 | |
| wa31 | 10 | 6 | |
| wb50 | 10 | 15 | |
| wb90 | 10 | 11 | |

FIG.7

| ID | LEARNING SCORE | COUNT | LEARNING COMPLETED FLAG |
|---|---|---|---|
| wa10 | 30 | 83 | LEARNING COMPLETED |
| wa31 | 10 | 6 | |
| wb50 | 10 | 15 | |
| wb90 | 40 | 110 | |
| wn14 | 19 | 118 | |

DOCUMENT PROCESSING DEVICE, DOCUMENT PROCESSING METHOD, PROGRAM, AND INFORMATION STORAGE MEDIUM

CROSS REFERENCE TO RELATED APPLICATIONS

This application is a National Stage of International Application No. PCT/JP2013/057908 filed on Mar. 19, 2013. The contents of each of the above documents are incorporated herein by reference in their entirety.

TECHNICAL FIELD

The present invention relates to a document processing device, a document processing method, a program, and an information storage medium.

BACKGROUND ART

Digital content, such as an electronic book and an HTML document, is now widely used. However, in order to read those kinds of digital content documents, the reader may need to have a certain level of knowledge about the reading and meaning of a word including kanji (Chinese characters), for example. To make such a document easier to read even by a person who lacks the necessary level of knowledge, supplemental information, such as characters (ruby characters) showing the reading of a kanji, is displayed in the sentence.

In Patent Literature 1, there is disclosed a technology for generating text marked with ruby characters based on a user's rank and a difficulty level of a character string for which furigana (ruby characters) are to be provided.

CITATION LIST

Patent Literature

[PTL 1] JP 11-39298 A

SUMMARY OF INVENTION

Technical Problem

In actual practice, the level of the person reading a document is something that changes. Meanwhile, it is difficult to read a document that does not match the level of the reader. For example, even for a kanji that at first could not be read, by reading the kanji marked with ruby characters several times, the person becomes able to read the kanji even without the ruby characters. As a result, the ruby characters marking the kanji that the person can now read are no longer necessary. As the number of kanji that the person can read but that are still marked with ruby characters increases, the document becomes more difficult for the person to read. This problem arises not only with ruby characters, but also in cases in which other types of supplemental information are displayed near the words. Therefore, in the document to be displayed, it is desirable that supplemental information be displayed based on changes in the level of the reader.

The present invention has been made in view of the problem described above. It is an object of the present invention to provide a technology for enabling supplemental information to be displayed based on changes in a user's ability to read a document.

Solution to Problem

In order to solve the problem described above, a document processing device according to one embodiment of the present invention includes: document acquisition means for acquiring information on a document including a plurality of words; supplemental information acquisition means for acquiring pieces of supplemental information, each piece of supplemental information being linked with one of the plurality of words; decision means for deciding, for each of the plurality of words, whether or not a piece of supplemental information linked with corresponding one of the plurality of words is to be displayed; and display control means for controlling the plurality of words and the pieces of supplemental information, which are decided to be displayed, so as to be displayed on a screen. The decision means are configured to decide, for each of the plurality of words, whether or not the corresponding one of the piece of supplemental information is to be displayed based on information indicating a frequency with which each of the plurality of words has been displayed along with the piece of supplemental information linked with corresponding one of the plurality of words.

Further, a document processing method according to one embodiment of the present invention includes: acquiring information on a document including a plurality of words; acquiring pieces of supplemental information, each piece of supplemental information being linked with one of the plurality of words; deciding, for each of the plurality of words, whether or not a piece of supplemental information linked with corresponding one of the plurality of words is to be displayed; and controlling the plurality of words and the pieces of supplemental information, which are decided to be displayed, so as to be displayed on a screen. The deciding whether or not a piece of supplemental information is to be displayed includes deciding, for each of the plurality of words, whether or not the corresponding one of the piece of supplemental information is to be displayed based on information indicating a frequency with which each of the plurality of words has been displayed along with the piece of supplemental information linked with corresponding one of the plurality of words.

Further, a program according to one embodiment of the present invention controls a computer to execute: acquiring information on a document including a plurality of words; acquiring pieces of supplemental information, each piece of supplemental information being linked with one of the plurality of words; deciding, for each of the plurality of words, whether or not a piece of supplemental information linked with corresponding one of the plurality of words is to be displayed; and controlling the plurality of words and the pieces of supplemental information, which are decided to be displayed, so as to be displayed on a screen. The deciding whether or not a piece of supplemental information is to be displayed includes deciding, for each of the plurality of words, whether or not the corresponding one of the piece of supplemental information is to be displayed based on information indicating a frequency with which each of the plurality of words has been displayed along with the piece of supplemental information linked with corresponding one of the plurality of words.

Further, a computer-readable storage medium according to one embodiment of the present invention stores the above-mentioned program.

According to the one embodiment of the present invention, the supplemental information can be displayed based on changes in the reader's ability to read the document.

According to one aspect of the present invention, the decision means may be configured to calculate, for each of the plurality of words, a score indicating a frequency with which corresponding one of the plurality of words has been displayed based on at least one of a position and a time at which one word or a plurality of words that are the same as the corresponding one of the plurality of words have been displayed along with the piece of supplemental information before the corresponding one of the plurality of words appears, and decide whether or not to display the piece of supplemental information linked with each of the plurality of words based on the score.

According to one aspect of the present invention, the decision means may be configured to decide whether or not to display the piece of supplemental information linked with each of the plurality of words based on a parameter that is based on a learning ability of a user.

According to one aspect of the present invention, the document processing device may further include: instruction acquisition means for acquiring an instruction that the piece of supplemental information for a displayed word is to be displayed or not to be displayed based on an operation performed on the screen by a viewing user; and setting means for setting the parameter that is based on the learning ability of the user based on the operation to display or not display the piece of supplemental information.

According to this aspect of the present invention, the display of unnecessary supplemental information can be suppressed based on a learning ability of the user.

According to one aspect of the present invention, the supplemental information acquisition means may be configured to acquire information indicating a difficulty level linked with each of the plurality of words, and the document processing device may further include setting means for setting the parameter that is based on the learning ability of the user based on the acquired difficulty level.

According to this aspect of the present invention, the display of unnecessary supplemental information can be suppressed based on the easiness of learning.

According to one aspect of the present invention, the document processing device may further include: means for acquiring an operation to display or not display the piece of supplemental information for a displayed word based on an operation performed on the screen by a viewing user; and setting means for setting a method of calculating the score based on the operation to display or not display the piece of supplemental information.

According to this aspect of the present invention, the display of unnecessary supplemental information can be suppressed based on the learning ability of the user.

According to one aspect of the present invention, the supplemental information acquisition means may be configured to acquire information indicating a difficulty level linked with each of the plurality of words, and the decision means may be configured to calculate, for each of the plurality of words, the score based on at least one of a position and a time at which one word or a plurality of words that are the same as corresponding one of the plurality of words have been displayed along with the piece of supplemental information before the corresponding one of the plurality of words appears, and a difficulty level of the corresponding one of the plurality of words.

According to this aspect of the present invention, the display of unnecessary supplemental information can be suppressed based on the easiness of learning.

BRIEF DESCRIPTION OF DRAWINGS

FIG. 5 is a diagram for illustrating an example of a processing flow by a supplemental information output decision unit and the like.

DESCRIPTION OF EMBODIMENTS

An embodiment of the present invention is described below with reference to the drawings. A duplicate description on components denoted by the same reference symbol is omitted.

Figure 1:
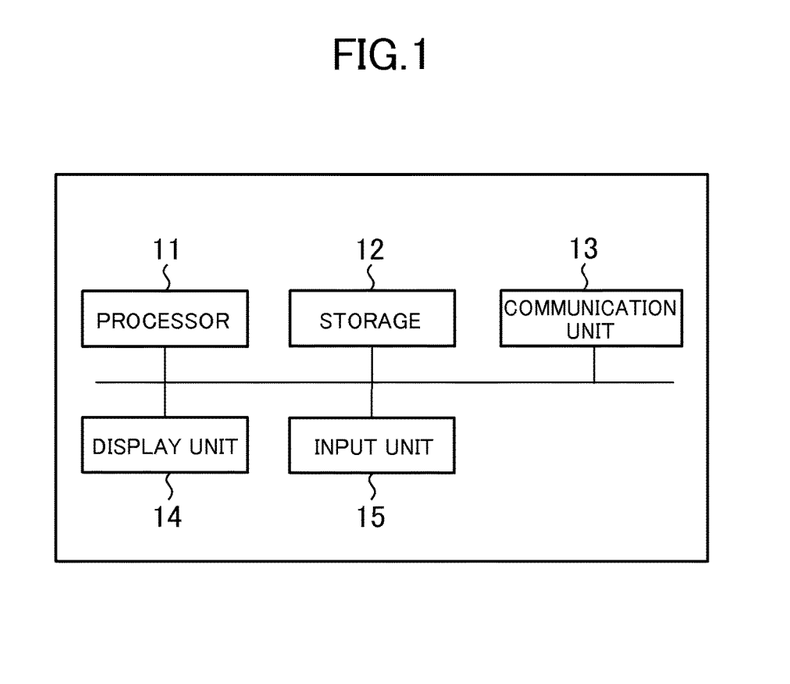
FIG. 1 is a diagram for illustrating an example of a hardware configuration of a document processing device according to an embodiment of the present invention.

FIG. 1 is a diagram for illustrating an example of a hardware configuration of a document processing device according to an embodiment of the present invention. The document processing device includes a processor 11, storage 12, a communication unit 13, a display unit 14, and an input unit 15. The document processing device is, for example, a tablet terminal or an electronic book terminal. Further, the document processing device may be, for example, a personal computer or a server computer connected to the above-mentioned terminals via a network.

The processor 11 operates as programmed by a program stored in the storage 12. The processor 11 controls the communication unit 13, the display unit 14, and the input unit 15. The program may be provided via the Internet or the like, or may be provided by being stored in a computer-readable storage medium such as a flash memory.

The storage 12 is constructed from a memory element such as a RAM or a flash memory, or from a memory card or the like. The storage 12 stores the program described above. The storage 12 also stores information and computation results input from other components.

The communication unit 13 implements a function of holding communication to and from other devices, and is constructed from, for example, an integrated circuit of a wireless LAN or from an antenna or the like. The communication unit 13, under control of the processor 11, inputs information received from other devices to the processor 11 or the storage 12 and transmits information to other devices.

The display unit 14 includes a display output device such as a liquid crystal display panel and a circuit for controlling the display output device. The display unit 14 is constructed from a liquid crystal panel, a graphics chip, and the like. The display unit 14 outputs an image to the display output device under the control of the processor 11. Note that, it is not necessary for the document processing device to include the display output device. The display unit 14 may display the image on an external display output device.

The input unit 15 includes a controller configured to acquire data from an input device such as a touch panel, a keyboard, and a mouse. The input unit 15 acquires, under the control of the processor 11, data input by a user operating a touch panel or an input device.

Figure 2:
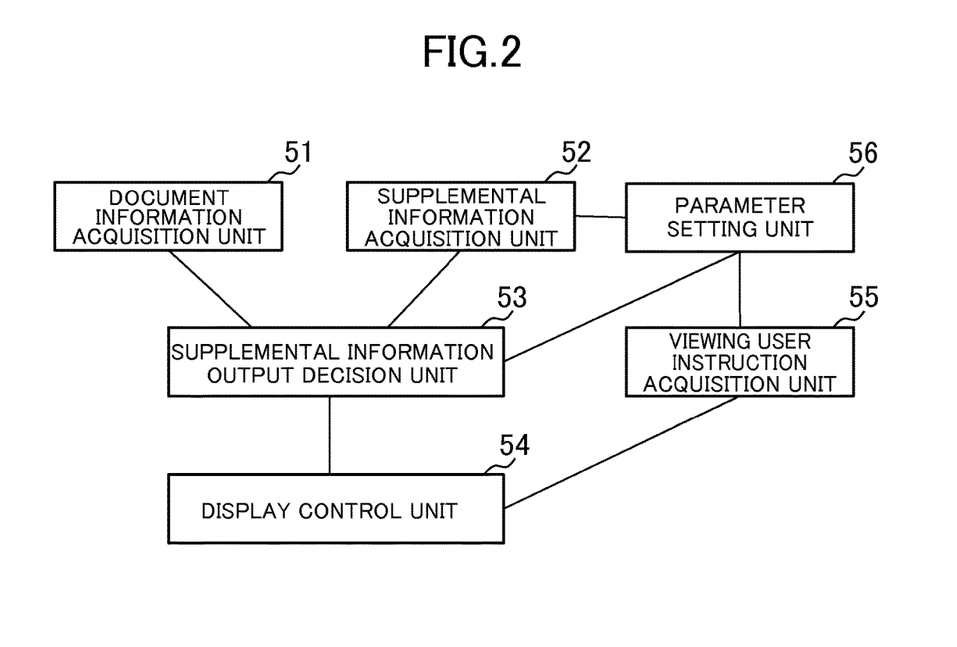
FIG. 2 is a block diagram for illustrating an example of functions executed by the document processing device.

FIG. 2 is a block diagram for illustrating functions executed by the document processing device. Functionally, the document processing device includes a document information acquisition unit 51, a supplemental information acquisition unit 52, a supplemental information output decision unit 53, a display control unit 54, a viewing user instruction acquisition unit 55, and a parameter setting unit 56. Those functions are executed by the processor 11 controlling the display unit 14, the input unit 15, and the like by executing programs stored in the storage 12. In this case, the document information acquisition unit 51, the supplemental information acquisition unit 52, the supplemental information output decision unit 53, the display control unit 54, the viewing user instruction acquisition unit 55, and the parameter setting unit 56 correspond to document acquisition means, supplemental information acquisition means, decision means, display control means, instruction acquisition means, and setting means, respectively, in the claims of the present invention.

Each of the functions executed by the document processing device is now described with reference to a processing flow and the other drawings.

The document information acquisition unit 51 is mainly executed by the processor 11 and the storage 12. The document information acquisition unit 51 acquires information (document data) on a document including a plurality of words, and transfers the acquired document information to the supplemental information output decision unit 53 and the like. The document information acquisition unit 51 may acquire document data stored in the storage 12 in advance, or acquire document data over a network via the communication unit 13.

Figure 3:
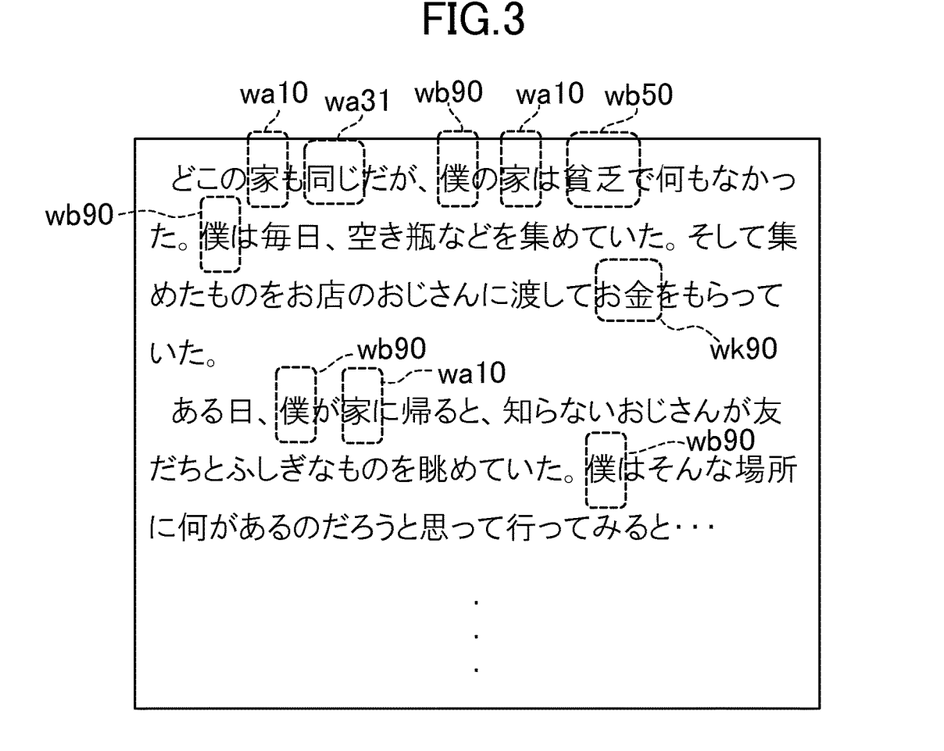
FIG. 3 is a diagram for showing an example of a document.

FIG. 3 is a diagram for showing an example of a document represented by document data. In this example, the document data is data of sentences written in Japanese. The sentences are written in a mixture of kanji (Chinese characters) and kana (Japanese phonetic characters). The words, which are the elements forming the sentences, are written using at least one of kanji and kana. In the present embodiment, the meaning of the term "word" includes compound words. In FIG. 3, some of the words appearing in the document are marked with a reference symbol. Those reference symbols correspond to word IDs. The IDs are described later.

Children in particular often are unable to read the kanji included in a word. However, in many cases, if a person knows a pronunciation of a kanji, the person has no difficulty in understanding what the kanji means. Therefore, the document processing device provides help during reading of a document by adding a character string of small kana (hereinafter referred to as "ruby characters") indicating the pronunciation of the kanji above the kanji character of the word. The following description focuses mainly on a case in which the ruby characters marked above the word are used as supplemental information.

The supplemental information acquisition unit 52 is mainly executed by the processor 11 and the storage 12. The supplemental information acquisition unit 52 acquires pieces of supplemental information, each piece of supplemental information being linked with one of the plurality of words, and information associated with the pieces of supplemental information. The supplemental information acquisition unit 52 may acquire supplemental information and the like stored in the storage 12 in advance, or acquire supplemental information and the like over a network via the communication unit 13.

Figure 4:
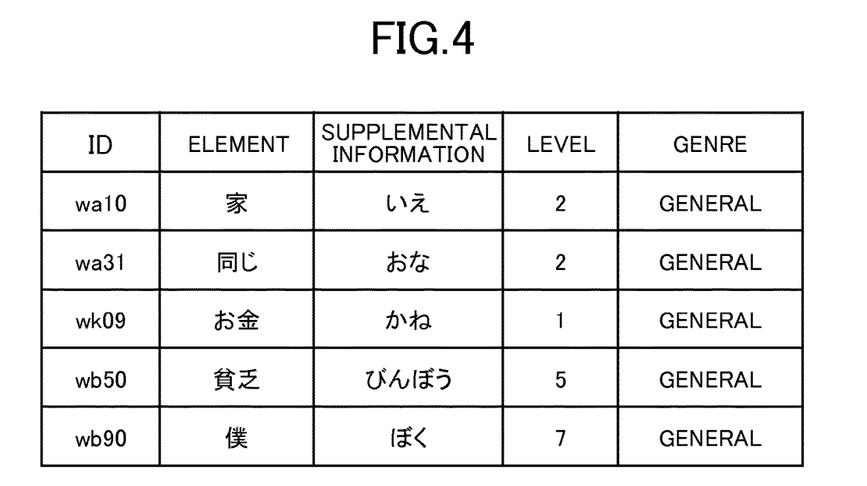
FIG. 4 is a diagram for showing an example of dictionary data including supplemental information.

FIG. 4 is a diagram for showing an example of dictionary data including supplemental information. The dictionary data is data linking a word with the supplemental information for that word. In this case, the supplemental information is information on how to read the word. Further, in the dictionary data, a level indicating a reading difficulty of the word and information on a genre of the word are also linked with the word. The level may be determined based on the school grade in which the kanji forming the word is learned, the number of strokes in the kanji, and the like. In the example shown in FIG. 4, an ID is assigned to each word. This ID corresponds to the reference symbol shown in FIG. 3.

The supplemental information output decision unit 53 is mainly executed by the processor 11 and the storage 12. The supplemental information output decision unit 53 decides whether or not to display, for each of the plurality of words, the supplemental information linked with each word based on information indicating an appearance frequency of the word. In the present embodiment, the decision of whether or not to display the supplemental information is performed by using a score that increases each time a word appears and decreases as time elapses since the word appeared as the information indicating the appearance frequency of the word.

Figure 5:
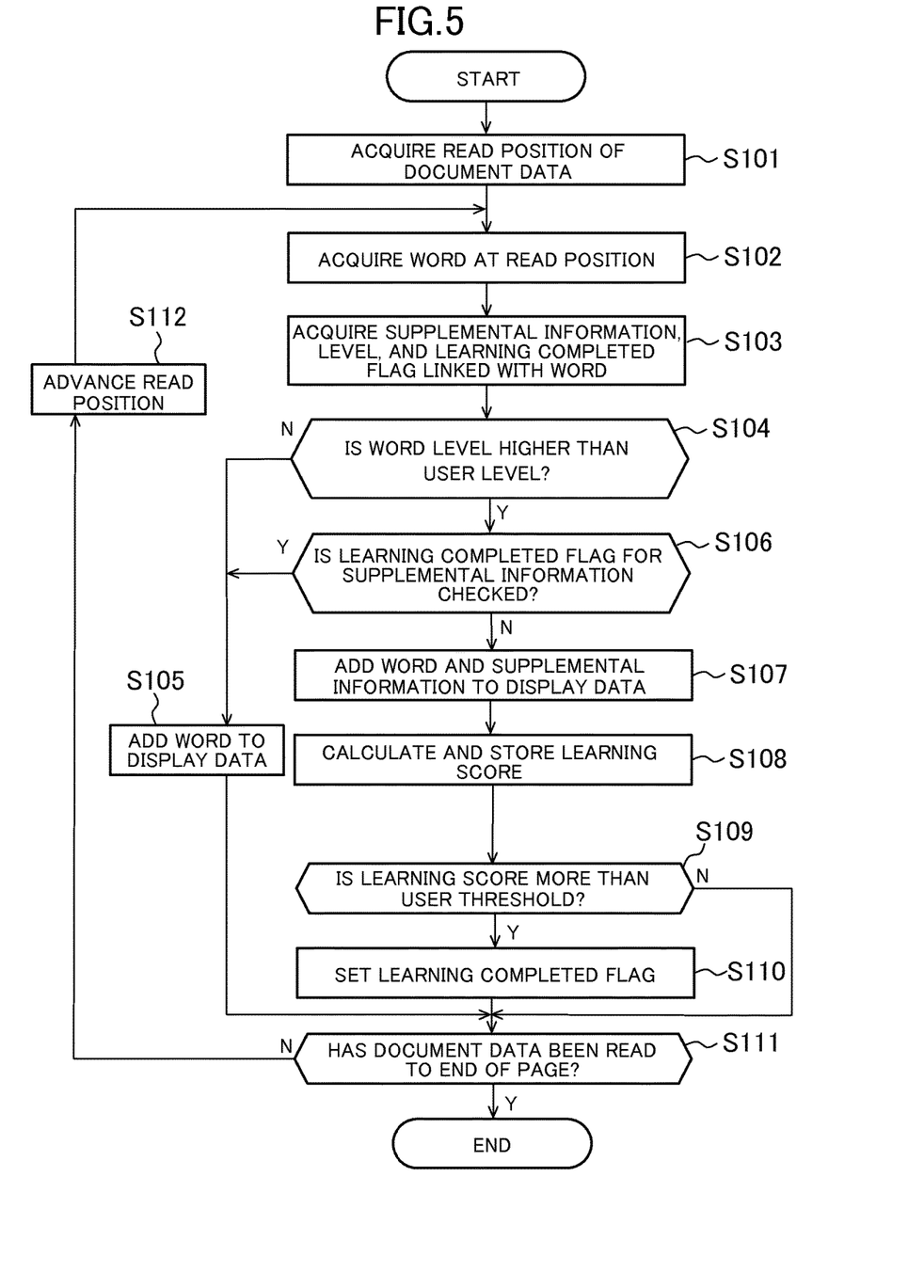

FIG. 5 is a diagram for illustrating an example of a processing flow by the supplemental information output decision unit 53 and the like. The processing performed by the supplemental information output decision unit 53 and the processing of other associated functions is described based on the processing flow illustrated in FIG. 5.

First, the supplemental information output decision unit 53 acquires a read position of the document data (Step S101). This read position, which is the position in the document data corresponding to the top of the page to be displayed of the document indicated by the document data, is a character count from the top of the document data. The supplemental information output decision unit 53 acquires the read position of the document data based on an operation for designating a page to be displayed by the user, who is the person viewing the document, an operation for advancing to the next page, an operation for returning to the previous page, the previously-read position, and the like.

Next, the supplemental information output decision unit 53 acquires the word at the read position (Step S102). This word may be extracted based on specifying information embedded in the document data in advance, or by the supplemental information output decision unit 53 analyzing morphemes from the text of the document data. In the former case, for example, the position of the word, the supplemental information per se to be linked with the word, or information such as an HTML tag indicating an identification code of the supplemental information may be embedded in the document data in advance. In the former case, the supplemental information output decision unit 53 acquires the word using that embedded information. Next, the supplemental information output decision unit 53 acquires the supplemental information linked with the word and the level indicating the difficulty of the word from the dictionary data, and acquires a learning completed flag. The learning completed flag indicates whether or not it is not necessary to display the supplemental information because the user has completed learning the word from the learning data (Step S103).

Figure 6:
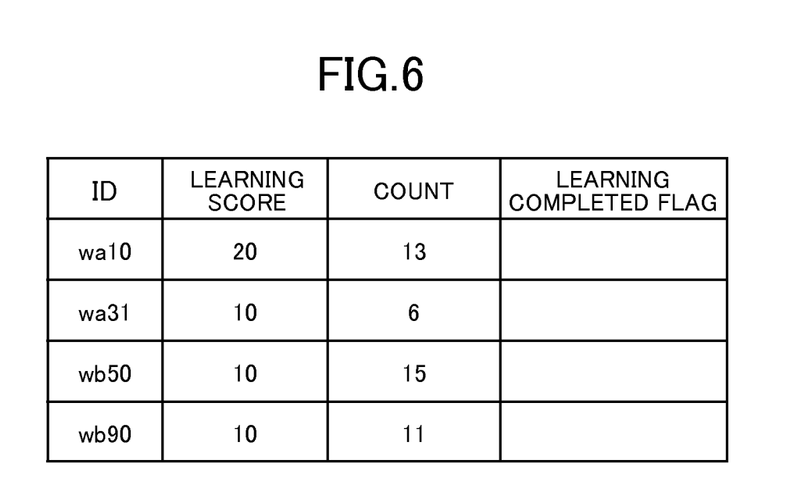
FIG. 6 is a diagram for showing an example of learning data.

FIG. 6 is a diagram for showing an example of learning data. A learning data record is provided for each word. The learning data record links each word with a learning score and a count calculated up to this point, and the learning completed flag. In this case, the count is a value calculated based on the position and the time at which the word most recently appeared. The learning completed flag indicates whether or not the user has completed learning the supplemental information for the word. The learning completed flag also indicates whether or not the supplemental information needs to be displayed.

After the supplemental information and the like have been acquired, the supplemental information output decision unit 53 decides whether or not it is necessary to display the supplemental information. More specifically, when the level indicating the difficulty of the word is equal to or less than a user level indicating a rough level of the knowledge of the user (N in Step S104), or when the learning completed flag indicates that learning has been completed (Y in Step S106), the supplemental information output decision unit 53 decides that the supplemental information is not to be displayed, and adds only the word to the display data (Step S105). In this case, the display data is data indicating the character string to be displayed on the screen by the display control unit 54 described later. Although described in more detail later, the display control unit 54 controls so that when supplemental information is included in the display data, the supplemental information is displayed, and so that when supplemental information is not included in the display data, the supplemental information is not displayed. Note that, although not illustrated in FIG. 5, the supplemental information output decision unit 53 also decides that supplemental information is not to be displayed when there is no supplemental information linked with the word. In this case, in Step S105, the supplemental information output decision unit 53 adds the word to the display data, and does not add supplemental information.

On the other hand, when the level indicating the difficulty of the word is higher than the user level (Y in Step S104), and when the display unnecessary flag indicates that the display is possible (N in Step S106), the supplemental information output decision unit 53 decides that the supplemental information is to be displayed, and adds the word and the supplemental information to the display data (Step S107). Note that, the method of adding the supplemental information may be carried out by adding the information for displaying the ruby characters using a <RUBY> tag in HTML, or by expressing the word and the supplemental information using another display language.

Next, the supplemental information output decision unit 53 updates information indicating the learning status regarding the word. First, the supplemental information output decision unit 53 calculates a learning score for the word, and updates a learning score column in the learning data (Step S108).

The method of calculating the learning score is now described in more detail. The supplemental information output decision unit 53 calculates, for each of the plurality of words included in the document data, a learning score based on at least one of the position and the time at which the word has appeared until now. In order to take into consideration the position and the time at which the word has appeared, in the learning data, the learning score calculated at the previous time the word appeared and a count based on the position and the time at which that word appeared are stored in association with the word. In FIG. 6, an example is shown of the learning data stored by the processing performed from the top of the document shown in FIG. 3 until the word with the ID "wb50" appears. The count is a value that increases as the position in the page or the time from starting viewing advances. The supplemental information output decision unit 53 stores in the storage 12 a count for the system. The value of the count increases each time a fixed period elapses after the function is first started. The value of the count also increases each time the character to be processed advances. Further, the supplemental information output decision unit 53 stores a system count at this processing point in the count column of the learning data. This count is used in order to take into consideration the forgetting that may occur as time passes since previously seeing the word. Next, an expression for calculating the score is shown.

[Math. 1]

$$S_{k+1} = \max(0, S_k \times \{1-(Cc-C_k) \times A\}) + B \tag{1}$$

In Expression (1), $S_{k+1}$ represents the score calculated by the processing, Cc represents the current system count, and $S_k$ and $C_k$ respectively represent the score and the count calculated when the word previously appeared. Parameter A is a forgetting parameter indicating how easily the user forgets words, and parameter B is a parameter indicating an amount of new learning gained by the display of the supplemental information for the word. Parameter B corresponds to the amount of the learning score that increases each time the word appears. $(Cc-C_k) \times A$ represents a rate of decrease in the learning score from when the word previously appeared as a result of forgetting words. Parameter A is a value greater than 0 and less than 1. Based on this expression, the learning score indicates the appearance frequency of the word for the user.

In this case, the amount by which the score increases may be decided based on the frequency of words that are displayed with supplemental information and how many types of words displayed with supplemental information there are. When the frequency of words that are displayed with supplemental information is high, or when there is a large number of types of words displayed with supplemental information, there is a heavy burden on the user, and as a result it may be more difficult for the user to remember the words. Such a situation can be handled by adjusting the values of A and B, which are parameters relating to score calculation, so that learning is not considered to have advanced in order to better match the reality of the user's learning.

When the learning score has been calculated, the supplemental information output decision unit 53 decides whether or not the learning score is more than a user threshold (Step S109). When the learning score is more than the user threshold (Y in Step S109), because this is considered to mean that the user has been able to learn the word, and for example, can now read the word without ruby characters, the learning completed flag of the learning data is set to learning completed (Step S110).

In this case, the parameter setting unit 56 is mainly executed by the processor 11 and the storage 12. The parameter setting unit 56 sets parameters based on the learning ability of the user.

The user threshold used in Step S108 is one of the parameters set by the parameter setting unit 56. Although not shown, the parameter setting unit 56 sets the user threshold during, or before, performing the processing carried out in Step S109. For example, the parameter setting unit 56 sets a higher user threshold when a difference between a user level Lu and a word level Lw is large. When the genre of documents often read by the user (a genre the user is good at) and the genre of the word overlap, a lower user threshold is set. As a result, the ease with which the user learns can be reflected in the decision of the display of supplemental information based on the type of word.

Then, after the word and the like have been added to the display data in Step S105 or Step S110, the supplemental information output decision unit 53 confirms whether or not the document data has been read to the end of the page, which is a unit of display (Step S111). When the read position is not yet at the end of the page (N in Step S111), the read position is advanced so that the word to be read next becomes the next word (Step S112), and the processing is then repeated from Step S102. Further, when the read position is at the end of the page (Y in Step S111), the processing of this page is finished. Note that, the system count, the user level information, the learning data, and the like are stored in the storage 12 even when the processing has finished, and are used again, for example, when the supplemental information output decision unit 53 next performs processing on other pages in this document or another document.

Next, the learning data is described. The learning data shown in FIG. 6 described above is the content of the learning data when processing is performed on the document data of the document shown in FIG. 3 until the word with the ID wb50 appears. In FIG. 6, an example is shown for a case in which the system count Cc and the learning score of each word are 0 when processing is started from the top of the document. Further, the user level is 1, and in the method of calculating the learning score, the parameter B is 10 and the parameter A is ½00. As a result, because there is no effect from forgetting at the point shown in FIG. 6, the learning score is proportional to the word appearance count.

Figure 7:
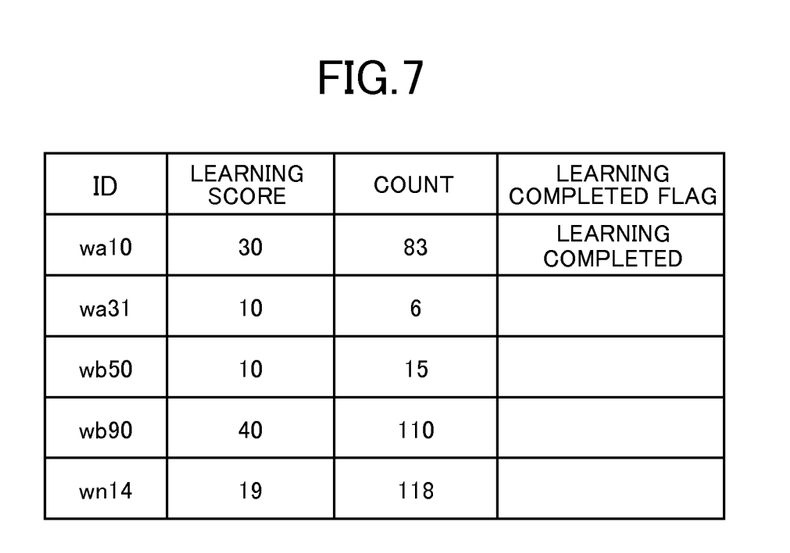
FIG. 7 is a diagram for showing another example of learning data.

FIG. 7 is a diagram for showing another example of learning data. FIG. 7 is a diagram for showing a state of the learning data when the ID wb90 has appeared four times in the document data. In this case, because there is a gap between when the word with the ID wn14 first appears and when the word appears a second time, the learning score is smaller than a value that is simply proportional to the appearance count. Through use of such a parameter indicating forgetting, the decision regarding whether or not learning has been completed may be carried out in consideration of whether or not there has been a long interval between appearances.

On the other hand, regarding the word with the ID wa10 and the word with the ID wb90, learning has been completed for the word having the lower learning score whereas learning has not been completed for the word having the higher learning score. This is because, as shown in FIG. 4, although the word with the ID wa10 has a level of 2, which is different from the user level only by one, the word with the ID wb90 has a level of 7, which is different from the user level by six, and hence the user thresholds are different. Thus, a learning principle that more difficult words take longer to learn can be taken into consideration.

In this case, instead of changing the user threshold, the parameter setting unit 56 may change the parameters A and B in the calculation method of Expression (1). For example, the parameter B may be set as a value calculated based on the difference between the user level Lu and the word level Lw, or based on a difference in genres. For example, factors such as the difference between Lw and Lu and the difference in genres may be taken into account by calculating so that the parameter B is set to a smaller value when the difference between Lw and Lu is larger, and is set to a larger value when the genre that the user is good at specified by the user in advance overlaps the genre of the word.

The display control unit 54 is mainly executed by the processor 11, the storage 12, and the display unit 14. The display control unit 54 controls the plurality of words included in the document data and the supplemental information for which a decision to display has been made so as to be displayed on the screen. More specifically, the display control unit 54 prepares the display format of the words in the document and the supplemental information that are stored in the display data, and controls so that the prepared display format is output to the screen via the display unit 14 and the like.

Figure 8:
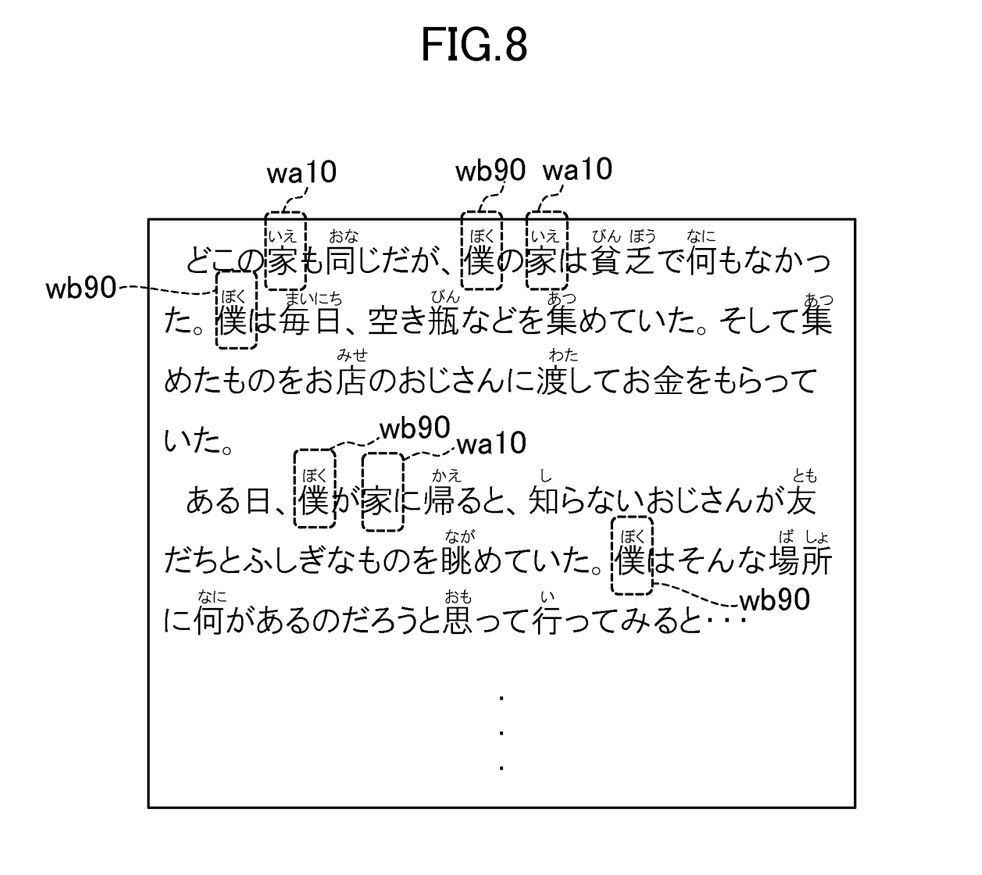
FIG. 8 is a diagram for showing an example of a document in which ruby characters are displayed.

FIG. 8 is a diagram for showing an example of a document in which ruby characters are displayed. In FIG. 8, ruby characters, which are supplemental information, are not displayed for the word with the ID wa10 from the third appearance of the word. Thus, the display of supplemental information may be controlled by the supplemental information output decision unit 53 and the display control unit 54 predicting the learning status of the user. As a result, the display of the supplemental information may be controlled based on the learning status.

Figure 9:
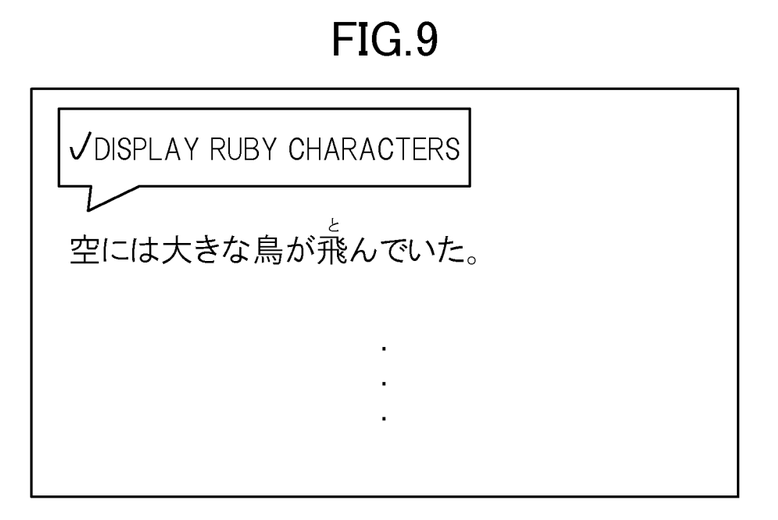
FIG. 9 is a diagram for showing an example of an operation for displaying ruby characters.

The viewing user instruction acquisition unit 55 is mainly executed by the processor 11, the storage 12, the display unit 14, and the input unit 15. The viewing user instruction acquisition unit 55 acquires information relating to whether or not supplemental information is necessary for a word in the document based on an action by the viewing user performed on the document displayed on the screen. More specifically, the viewing user instruction acquisition unit 55 acquires an operation indicating whether or not the supplemental information for a word is to be displayed based on an operation performed on the document displayed on the screen. And the viewing user instruction acquisition unit 55 displays the supplemental information for the word or deletes the displayed supplemental information. FIG. 9 is a diagram for showing an example of an operation for displaying ruby characters. For example, when the user selects a word for a fixed period of time, the viewing user instruction acquisition unit 55 displays a popup window on the screen for confirming whether or not supplemental information is to be displayed. When the user performs an operation instructing the ruby characters to be displayed by selecting a checkbox in the popup window, for example, the viewing user instruction acquisition unit 55 acquires that instruction to display the supplemental information. Further, the viewing user instruction acquisition unit 55 transfers the instruction to the display control unit 54, and the display control unit 54 performs processing for displaying the supplemental information for the word.

Figure 10:
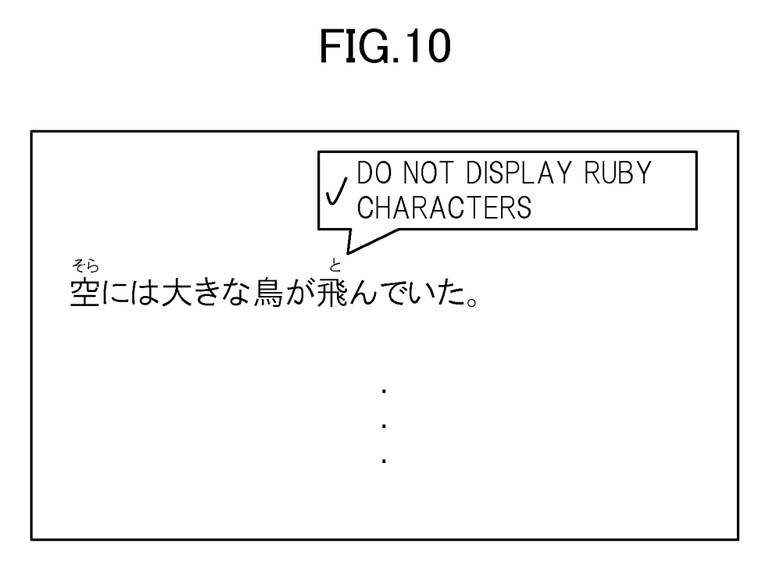
FIG. 10 is a diagram for showing an example of an operation for suppressing the display of ruby characters.

On the other hand, FIG. 10 is a diagram for showing an example of an operation for suppressing the display of ruby characters. For example, when the user selects a word for which supplemental information is being displayed for a fixed period of time, the viewing user instruction acquisition unit 55 displays a popup window on the screen for confirming whether or not the display of the supplemental information is to be suppressed. When the user performs an operation instructing the display of the supplemental information to be suppressed by selecting a checkbox in the popup window, for example, the viewing user instruction acquisition unit 55 acquires that instruction. Then, the viewing user instruction acquisition unit 55 transfers the instruction to the display control unit 54, and the display control unit 54 performs processing for suppressing the display of the supplemental information for the word and other instances of the same word on the page. The display control unit 54 also performs processing for deleting the supplemental information from the screen, and setting the word in the learning data to learning completed.

Note that, the viewing user instruction acquisition unit 55 may also be configured to detect a ruby character display request by using a user's eye gaze. For example, the viewing user instruction acquisition unit 55 may detect the user's eye gaze based on a known gaze detection technology and predict the word that the user is looking based on the detected user's eye gaze. When the word is being looked for more than a predetermined period of time, the viewing user instruction acquisition unit 55 may decide that the user is having difficulty reading the word, and acquire a display request for the word.

In addition, the viewing user instruction acquisition unit 55 may also be configured to use the user's voice when the user reads aloud in order to specify a kanji the user did not read correctly. In this case, the viewing user instruction acquisition unit 55 acquires the user's voice when the user reads a sentence out loud by a microphone, recognizes the user's voice based on a known voice recognition technology, and compares the recognized voice with a reading (kana) of the sentence stored in advance. Based on this processing, the viewing user instruction acquisition unit 55 specifies the words that were not read correctly (words requiring supplemental information). In the subsequent processing, the words specified as having been not read correctly are handled in the same manner as the words for which a display request has been made as described above.

Further, the parameter setting unit 56 performs processing for changing a parameter indicating the learning ability of the user based on an instruction that the supplemental information be displayed or not be displayed. For example, when an operation has been performed instructing the display of the supplemental information for a word that is stored in the learning data as having been learned, the parameter setting unit 56 may decide that the learning ability of the user is low, and hence set a higher user threshold. Note that, instead of this method, the method of calculating the learning score may be changed. For example, the parameter setting unit 56 may instead decrease the parameter B and increase the parameter A in Expression (1). Further, the parameter setting unit 56 may decrease the user threshold, or increase the parameter B or decrease the parameter A, when the frequency of an operation for suppressing the display of the supplemental information is more than a value set in advance. Note that, when the supplemental information is set not to be displayed because the user already knew the word before even reading the document, the relationship with the user's learning ability may be considered to be weak. Therefore, the parameter setting unit 56 may not be configured to change the parameters even when an instruction not to display the supplemental information has been made when the word is a word for which the supplemental information is being displayed for the first time.

Note that, the present invention may be applied in cases other than cases in which kanji and kana are combined. For example, the present invention may also be applied to combinations of words written using the Chinese characters used in the Chinese language and pinyin indicating the reading of those words, or to combinations of English words and character strings indicating the pronunciation of those words. Further, the present invention may also be applied to combinations of words forming a document in a given language and words in another language indicating the meaning of those words. The reason why the present invention may be applied in each of those cases is because there is a relationship between the words as the body of the document and the supplemental information for those words.

The invention claimed is:

1. A document processing device, comprising:
    a display screen
    at least one processor, and
    at least one memory device that stores a plurality of instructions, which when executed by the at least one processor, causes the at least one processor to:
    acquire information on a document including a plurality of words;
       acquire pieces of supplemental information, each piece of supplemental information being linked with one of the plurality of words;
       acquire information indicating a difficulty level linked with each of the plurality of words,
       calculate a learning score for each of the plurality of words based on:
       i. information indicating a frequency with which each of the plurality of words has been displayed,
       ii. the piece of supplemental information linked with the corresponding one of the plurality of words,
       iii. a forgetting parameter for decreasing the learning score and which indicates passed time since previously seeing the corresponding one of the plurality of words, and
       iv. a learning parameter indicating an increasing amount of the learning score gained by the display of one of the pieces of supplemental information linked with the one of the plurality of words;
       determine, for each of the plurality of words, whether or not a specific piece of supplemental information linked with a corresponding one of the plurality of words is to be displayed based on whether or not the calculated learning score is more than a user threshold;
       acquire an instruction indicating if the piece of supplemental information for a displayed word is to be displayed or not to be displayed based on an operation performed on the display screen by a viewing user;
       display the plurality of words and the pieces of supplemental information, which are decided to be displayed, on the display screen;
       and
       change one of the learning parameter, the forgetting parameter and the user threshold based on the acquired difficulty level each time the instruction is acquired,
       wherein the learning score is calculated so that a reduction of the learning score becomes larger while a difference between a current system count and a previous system count when the word previously appeared is larger, and the learning score increases while the supplemental information for the word is displayed.

2. The document processing device according to claim 1, wherein, in the calculation , the processor calculates, for each of the plurality of words, the learning score indicating a frequency with which the corresponding one of the plurality of words has been displayed based on at least one of a position and a time at which one word or a plurality of words that are the same as the corresponding one of the plurality of words have been displayed along with the piece of supplemental information before the corresponding one of the plurality of words appears and the learning parameter that indicates learning ability of the user.

3. The document processing device according to claim 2, wherein, in the parameter changing, the processor changes one of the learning parameter and the forgetting parameter for calculating the learning score based on the instruction to display or not display the piece of supplemental information.

4. The document processing device according to claim 2, wherein, in the supplemental information acquisition, the processor acquires information indicating the difficulty level linked with each of the plurality of words, and
wherein, in the calculation, the processor calculates, for each of the plurality of words, the learning score based on at least one of a position and a time at which one word or a plurality of words that are the same as the corresponding one of the plurality of words have been displayed along with the piece of supplemental information before the corresponding one of the plurality of words appears, and the difficulty level of the corresponding one of the plurality of words and based on one of the learning parameter and the forgetting parameter.

5. The document processing device according to claim 1, wherein, in the parameter changing, the processor changes one of the learning parameter, the forgetting parameter and the user threshold based on a frequency of the instruction of suppressing the display of the piece of the supplemental information.

6. The document processing device according to claim 1, wherein, in the determination, the processor decides, for each of the plurality of words, whether or not the corresponding one of the word is learned based on information indicating a frequency with which each of the plurality of words has been displayed along with the piece of supplemental information linked with the corresponding one of the plurality of words and based on one of the learning parameter, the forgetting parameter and the user threshold, and
wherein, in the parameter changing, the processor changes one of the learning parameter, the forgetting parameter and the user threshold based on whether or not the viewing user instructs to display the supplemental information for a word that is decided as having been learned.

7. The document processing device according to claim 1, wherein, each of the learning parameter, the forgetting parameter and the user threshold is common to the plurality of words.

8. The document processing device according to claim 1, wherein the learning score is calculated according to a formula:

$$S_{k+1}=\max(0, S_k \times \{1-(C_c-C_k) \times A\})+B$$

where $S_{k+1}$ represents the learning score, $C_c$ represents the current system count, $S_k$ and $C_k$ respectively represent a previous learning score and the previous system count when the word previously appeared, A is the forgetting parameter and B is an amount of new learning gained by the display of supplemental information for the word.

9. A document processing method, comprising:
acquiring, with at least one processor operating with a memory device in a computer, information on a document including a plurality of words;
acquiring, with the at least one processor operating with the memory device in the computer, pieces of supplemental information, each piece of supplemental information being linked with one of the plurality of words;
acquiring, with the at least one processor operating with the memory device in the computer, information indicating a difficulty level linked with each of the plurality of words;
calculating, with the at least one processor operating with the memory device in the computer, a learning score for each of the plurality of words based on:
i. information indicating a frequency with which each of the plurality of words has been displayed,
ii. the piece of supplemental information linked with the corresponding one of the plurality of words,
iii. a forgetting parameter for decreasing the learning score and which indicates passed time since previously seeing the corresponding one of the plurality of words and
iv. a learning parameter indicating an increasing amount of the learning score gained by the display of one of the pieces of supplemental information linked with the one of the plurality of words;
deciding, for each of the plurality of words, whether or not a specific piece of supplemental information linked with corresponding one of the plurality of words is to be displayed based on whether or not the calculated learning score is more than a user threshold with the at least one processor operating with the memory device in the computer;
acquiring, with the at least one processor operating with the memory device in the computer, an instruction indicating if the piece of supplemental information for a displayed word is to be displayed or not to be displayed based on an operation performed on a display screen by a viewing user;
displaying the plurality of words and the pieces of supplemental information, which are decided to be displayed; and
changing, with the at least one processor operating with the memory device in the computer, one of the learning parameter, the forgetting parameter and the user threshold based on the instruction to display or not to display the piece of supplemental information and based on the acquired difficulty level each time the instruction is acquired,
wherein the learning score is calculated so that a reduction of the learning score becomes larger while a difference between a current system count and a previous system count when the word previously appeared is larger, and the learning score increases while the supplemental information for the word is displayed.

10. A non-transitory computer-readable information storage medium storing a plurality of instructions, wherein when executed by at least one processor, the plurality of instructions cause the at least one processor to:
acquire information on a document including a plurality of words;
acquire pieces of supplemental information, each piece of supplemental information being linked with one of the plurality of words;
acquire information indicating a difficulty level linked with each of the plurality of words;
calculate a learning score for each of the plurality of words based on:
i. information indicating a frequency with which each of the plurality of words has been displayed,
ii. the piece of supplemental information linked with the corresponding one of the plurality of words, iii. a forgetting parameter for decreasing the learning score which indicates passed time since previously seeing the corresponding one of the plurality of words and
iv. a learning parameter indicating an increasing amount of the learning score gained by the display of one of the pieces of supplemental information linked with the one of the plurality of words;

decide, for each of the plurality of words, whether or not a specific piece of supplemental information linked with corresponding one of the plurality of words is to be displayed based on whether or not the calculated learning score is more than a user threshold;

acquire an instruction indicating if the piece of supplemental information for a displayed word is to be displayed or not to be displayed based on an operation performed on a display screen by a viewing user;

display the plurality of words and the pieces of supplemental information, which are decided to be displayed; and change one of the learning parameter, the forgetting parameter and the user threshold based on the acquired difficulty level each time the instruction is acquired, wherein the learning score is calculated so that a reduction of the learning score becomes larger while a difference between a current system count and a previous system count when the word previously appeared is larger, and the learning score increases while the supplemental information for the word is displayed.

* * * * *